(No Model.) 8 Sheets—Sheet 1.

C. M. SPENCER & A. H. EDDY.
SCREW MAKING MACHINE.

No. 537,865. Patented Apr. 23, 1895.

Fig. 1.

Witnesses:
Robt Ruddell,
Fred. J. Dole.

Inventors:
Christopher M. Spencer,
Arthur H. Eddy.
By their Attorney,
F. H. Richards

(No Model.) 8 Sheets—Sheet 4.

C. M. SPENCER & A. H. EDDY.
SCREW MAKING MACHINE.

No. 537,865. Patented Apr. 23, 1895.

Witnesses:
Robt. Ruddell.
Fred. J. Dole.

Inventors:
Christopher M. Spencer,
Arthur H. Eddy.
By their Attorney,
F. H. Richards (No Model.) 8 Sheets—Sheet 6.

C. M. SPENCER & A. H. EDDY.
SCREW MAKING MACHINE.

No. 537,865. Patented Apr. 23, 1895.

Witnesses:
Robt Ruddell.
Fred. J. Dole.

Inventors:
Christopher M. Spencer,
Arthur H. Eddy.
By their Attorney,
F. H. Richards

UNITED STATES PATENT OFFICE.

CHRISTOPHER M. SPENCER, OF WINDSOR, AND ARTHUR H. EDDY, OF HARTFORD, CONNECTICUT.

SCREW-MAKING MACHINE.

SPECIFICATION forming part of Letters Patent No. 537,865, dated April 23, 1895.

Application filed June 16, 1894. Serial No. 514,748. (No model.)

*To all whom it may concern:*

Be it known that we, CHRISTOPHER M. SPENCER, residing at Windsor, and ARTHUR H. EDDY, residing at Hartford, in the county of Hartford, State of Connecticut, citizens of the United States, have invented certain new and useful Improvements in Screw-Making Machines, of which the following is a specification.

This invention relates to screw-making machines; the object of the invention being to provide a screw-making machine of an improved construction and organization which shall be automatic in its operation and which shall be especially adapted for making the higher grades of screws, such, for instance, as are used in connection with electrical appliances; and to provide means whereby a screw-wire of indefinite length may be turned down, headed and screw-threaded to form a screw-blank, and be subsequently cut off, axially drilled, threaded and slotted at its headed end, as will be hereinafter more fully described.

In the drawings accompanying and forming a part of this specification, Figure 1, Sheet 1, is a side elevation of a screw-making machine embodying our invention.

Similar characters designate like parts in all of the figures.

In the organization thereof herein shown and described, the screw-making machine comprises a suitable framework adapted for carrying the several operative parts, a turret mounted for intermittent rotary movement upon a carriage supported for sliding movement upon the bed of the machine, a plurality of tools carried by said turret, means for intermittently rotating said turret to bring the tools successively into working position, a reciprocatory tool-head carrying a plurality of radially-disposed sliding tool-carriers, tools carried by said carriers, means for intermittently and successively operating said tool-carriers, a rod-carrying or chucking-spindle adjacent to and adapted for supporting the work intermediate to the tools and in position to be operated upon thereby, one or more independently-operable tools supported at the side of, and remote from the turret, and means for independently operating said tools, all of which will be hereinafter more fully described.

Figure 5:
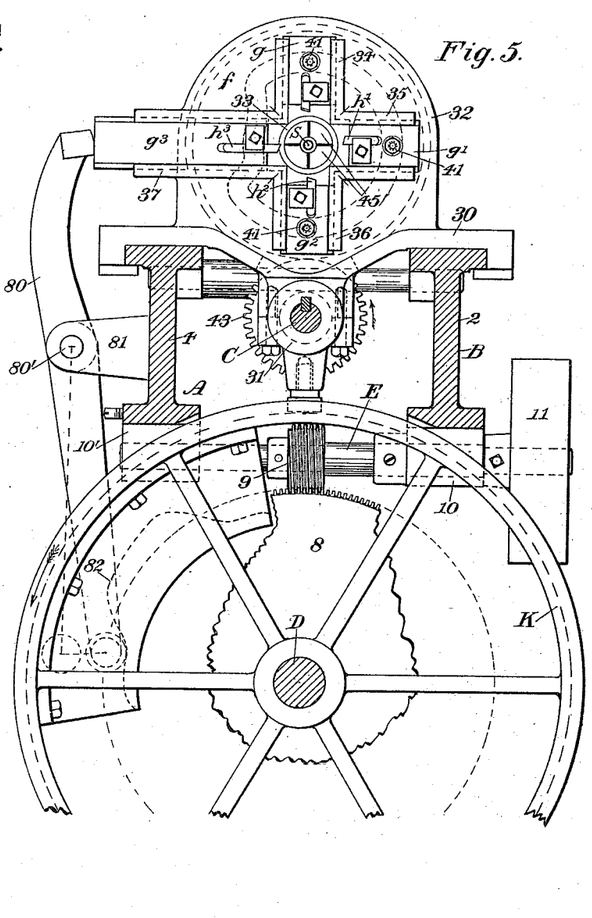
Fig. 5, Sheet 4, is a vertical cross-section of a portion of the machine taken on line $a$—$a$, Fig. 1, showing the parts at the left hand of said line as seen from a point at the right hand thereof.
Figures 6, 18, 19, 20, 21:
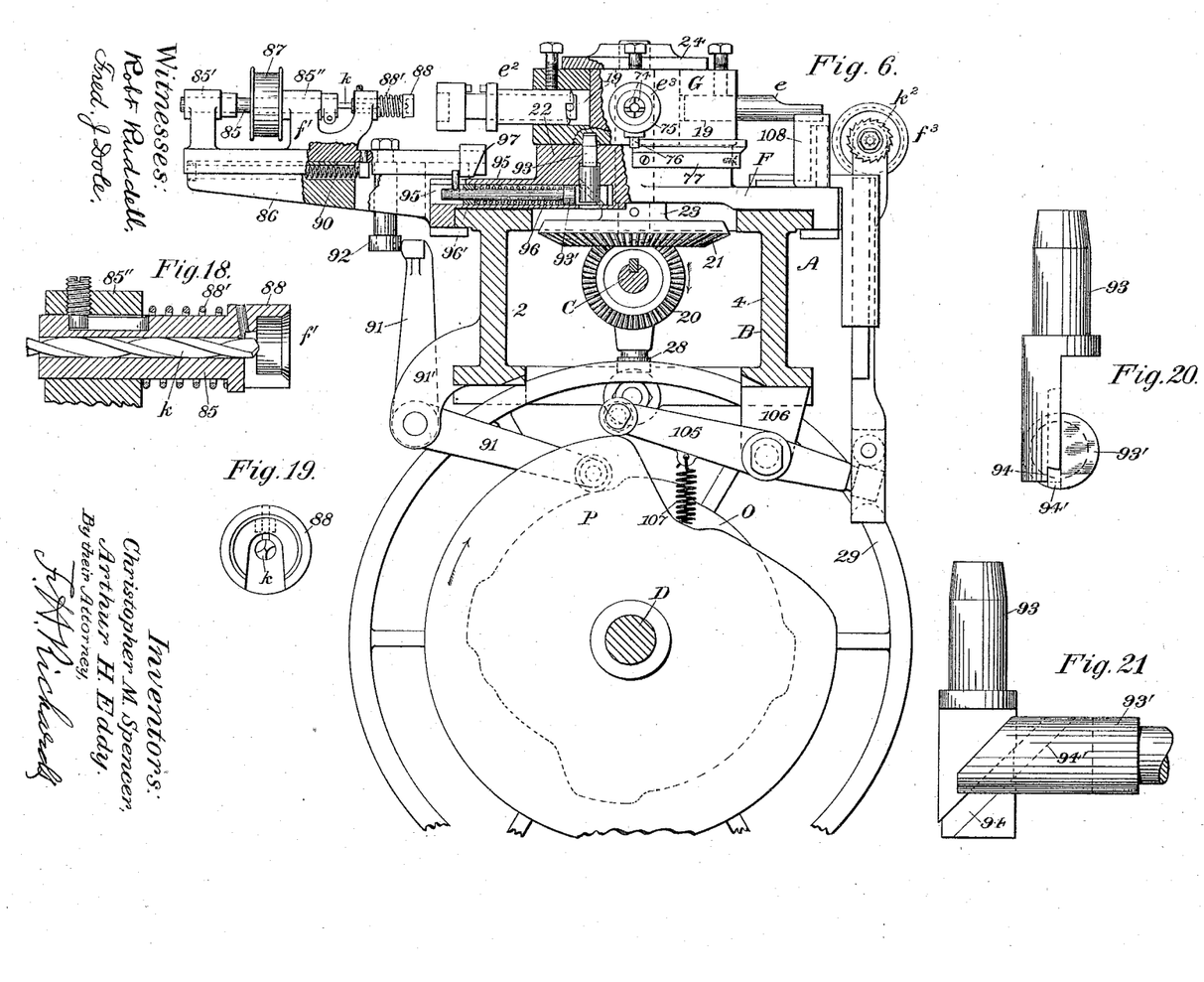
Fig. 6, Sheet 5, is a vertical cross-sectional view taken on line $a$—$a$, Fig. 1, showing the parts at the right hand of said line as seen from a point at the left hand thereof.
Fig. 18, Sheet 5, is a central longitudinal section of a portion of the reciprocatory screw-blank-drilling device.
Fig. 19, Sheet 5, is an end view of the drilling device looking toward the left hand in Fig. 18.
Figs. 20 and 21, Sheet 5, are end and side elevations, respectively, of the turret-locking bolt and a portion of its actuator, said figures showing the bolt in two positions relative to its actuator.

The framework of the machine, which is designated in a general way by A, may be of any form of construction suitable for carrying the several operative details of the mechanism, it consisting essentially of the bed B, comprising two side rails, 2 and 4, and end-rails, 3 and 5, the side-rails of which are outwardly flanged as clearly shown in Figs. 5 and 6 to constitute the slideways for the sliding parts of the screw-forming mechanism. This bed B will usually be supported at its ends upon suitable legs or standards, 6 and 6', which in turn are supported in the oil-pan 7, located underneath the working parts of the machine, which oil-pan as herein shown constitutes the base proper of the machine.

Journaled in bearings formed in the end rails 3 and 5 is a horizontal shaft C, which constitutes the driving-shaft for intermittently rotating certain elements of the machine, as will be hereinafter more fully described, and journaled in bearings in the legs or supporting standards 6 and 6' in vertical alignment with the intermittently-operable shaft C is a horizontal cam-shaft D, upon which are located the several cams for imparting the requisite movements to various working parts of the machine, this shaft also carrying means for intermittently rotating the shaft C, as will be hereinafter more fully described.

As a means for continuously rotating the cam-shaft D, said cam-shaft is provided with a worm-wheel 8, the teeth of which mesh with a worm 9, upon a transversely-disposed shaft E, (which constitutes the driving shaft,) journaled in bearings, 10 and 10', secured to or formed upon the side-rails 2 and 4 of the bed of the machine, as most clearly shown in Fig. 5 of the drawings, said shaft being provided at its outer end with a driving pulley 11, over which a belt, (not shown) may extend to any suitable source of power for driving said shaft.

As a means for intermittently rotating the shaft C, the cam-shaft D is provided at one end, (shown in Fig. 1 at the right hand end,) with a driving-wheel 12, having a series of remotely disposed cam-like working faces 13, herein shown in the nature of radially-disposed projecting arms 13' having inclined working ends, in position and adapted for engaging similarly-disposed working-faces 14, upon and for operating an intermediate gear-wheel 15, revolubly-carried upon a stud 16, secured in the end of the framework, said gear-wheel 15, meshing with a pinion 17, carried upon the shaft C. The working faces 14 of the intermediate driving-wheel 15, in the form thereof herein shown, are in the nature of remotely-disposed rollers, carried upon studs 18, secured to the face of the gear-wheel 15 and in position and adapted to be successively engaged by the successive working faces 13 of the driving wheel 12, whereby said intermediate wheel 15 is intermittently rotated to rotate the gear-wheel 17 and its connected shaft C, the requisite distance. It is desired to state in this connection, that the mechanism for imparting an intermittent movement to the shaft C might be modified without departure from this invention, although the mechanism just described is preferable, as it possesses capabilities highly advantageous to machines of this class.

The co-acting working faces 13 and 14 of the two wheels 12 and 15, respectively, will, in practice, preferably be removably secured to said wheels, provision being made for altering the positions thereof, and for the application of a greater or less number so as to secure variable intermittent movements, if required, and to increase or decrease the intermittent travel or movement imparted to the shaft C, as may be necessary in the manufacture of certain forms of screws.

Revolubly mounted upon a carriage or turret-slide F, supported for sliding movement upon the bed of the machine, is a tool-carrying turret G, having therein a plurality of radially-disposed tool-receiving sockets 19, herein shown as four in number, in which are or may be secured a series of tools, $e$, $e'$, $e^2$, and $e^3$, adapted to be successively brought into alignment with the screw-rods or work to be operated upon after the manner of tools in turret-lathes of ordinary construction, said turret being in this instance automatically and intermittently rotated by means of gearing in connection therewith and in connection with the intermittently-revoluble shaft C, said turret being locked in its successive operative positions by means of a locking device hereinafter described. The sliding carriage is or may be mounted upon slide ways of the bed in any usual manner, by overhanging flanges and straps, as shown, or otherwise.

Figure 7:
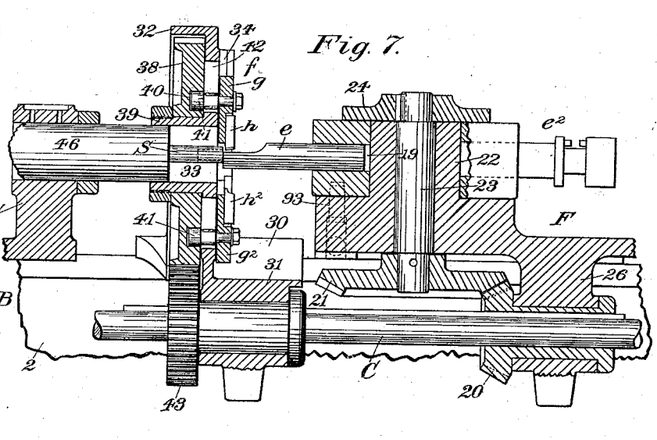
Fig. 7, Sheet 6, is a vertical longitudinal section of a portion of the machine taken on line $b$—$b$, Fig. 2.

One form of mechanism for intermittently rotating said turret, as shown most clearly in Figs. 6 and 7 of the drawings, consists of a bevel-wheel 20, splined upon the shaft C, the teeth of which bevel-wheel mesh with the teeth of a similar bevel-wheel 21, secured to a vertical shaft 23, extending through the carriage F and turret-carrying-column 22, formed integral therewith, said shaft being fixed at its upper end to the turret, preferably, by means of the cap 24, which has a bearing upon the upper end of the turret-carrying-column and is secured to the turret G by means of screws, 25. To insure a reciprocating movement of the bevel-wheel 20 upon the shaft C with the carriage F, the hub of said bevel-wheel is flanged at its end and is revolubly supported in a bearing formed in the apron, or depending portion 26 of the said carriage, said apron being formed in two pieces, it being divided transversely in alignment with the axis of the shaft C for the purpose of assembling the parts, the lower portion thereof being secured to the upper portion, preferably, by means of lag-screws, 27.

As a means for imparting the requisite intermittent reciprocatory movement to the turret-carriage and turret, the depending portion or apron 26 of said carriage is provided at its lower end with a stud or roller 28, which has a bearing at its periphery against the working, or cam faces of a cam-wheel 29, secured to the cam-shaft D. In the construction thereof herein shown, the working faces of the cam-wheel 29 are formed by grooving said cam peripherally, but it is obvious that the cam-wheel might be provided with cam-straps in the usual manner.

Surrounding the turret G, and preferably in radial disposition with relation to the axis thereof, is a series of tool-carrying heads, $f$, $f'$, $f^2$, and $f^3$, herein shown as four in number, three of them being constructed and adapted for horizontal sliding movement in lines radiating from the axis of the turret, while one of them is constructed and adapted for vertical sliding movement in lines parallel to the axis of said turret. The tool-carrying head $f$, which is constructed for carrying a plurality of tools, is supported for sliding movement upon the bed of the machine at one side of the turret-carriage F, and is adapted to be reciprocated in lines coinciding with the movement of the turret-carriage but entirely independent of any movement of said carriage, while the tool-carrying heads $f'$, $f^2$, and $f^3$ are supported upon slide-ways formed upon or secured to said carriage, and while they move in unison with the carriage, are also capable of a sliding movement radially toward and from the turret G.

The tool-carrying head $f$ is herein shown consisting of the base 30, supported for sliding movement upon the bed of the machine and having the depending portion or apron 31, and the upright, or tool-carrying portion 32, which tool-carrying portion is centrally and transversely bored, or recessed, as shown at 33, to permit the stock or screw-rod to be operated upon to be extended therethrough.

Figure 8:
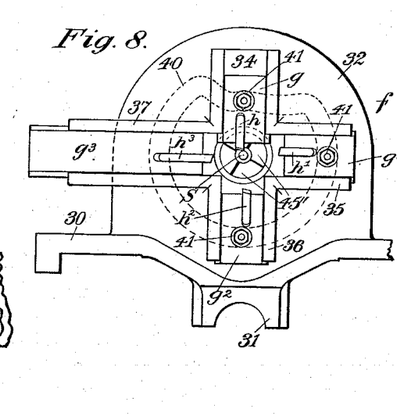
Figs. 8, 9 and 10, Sheet 6, are front elevations of the sliding tool-carrier or head showing three successive positions, respectively, of the tool-slides and tools carried thereby, illustrating the operation of forming the head upon the screw-blank.
Figure 9:
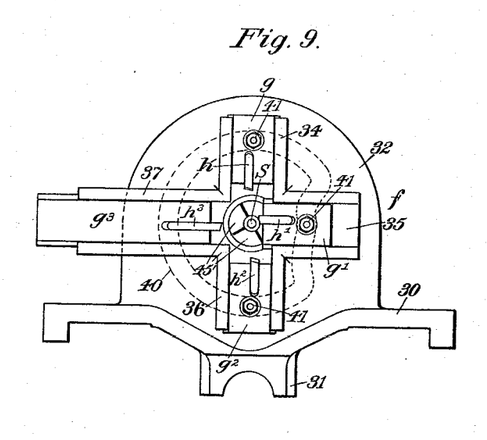
Figure 10:
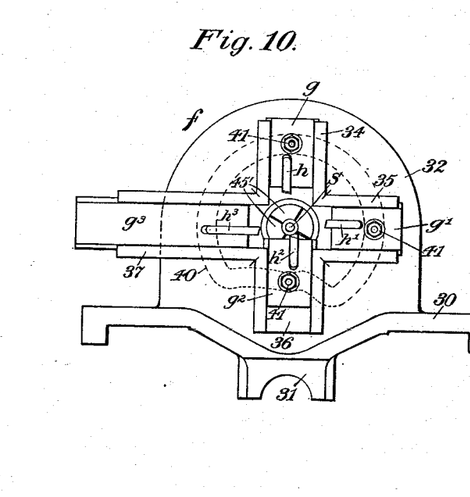
Figure 11:
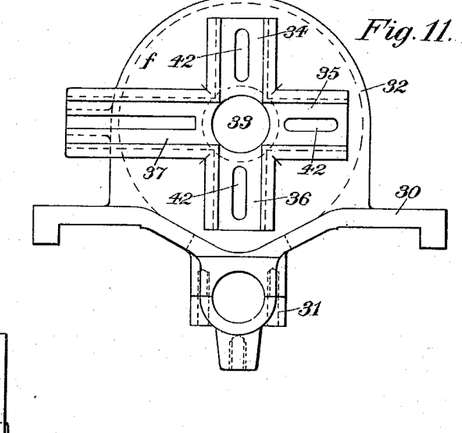
Fig. 11, Sheet 4, is a detail, in front elevation, of the sliding tool-head removed from the bed of the machine.
Figure 12:
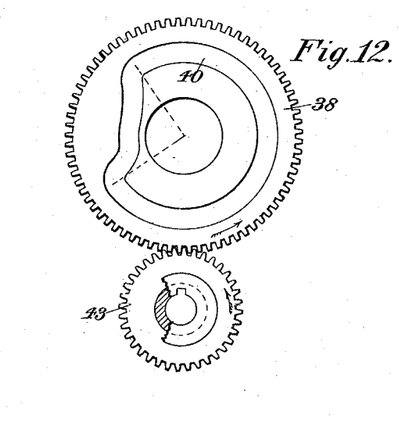
Fig. 12, Sheet 4, is a front elevation of the tool-traversing cam and gearing for rotating the same.

Formed upon or secured to the front face of the upright 32 of the tool-head $f$ is a series of radially-disposed slide-ways 34, 35, 36 and 37, in which is seated for sliding movement a series of tool-carrying slides, or holders, $g$, $g'$, $g^2$ and $g^3$, respectively, which are adapted for sliding movement in radial lines toward and from a common center, as will be understood by reference to Figs. 8, 9 and 10 of the drawings.

As a means for imparting a reciprocatory movement to the sliding tool-carrying head $f$, the apron or depending portion 31 thereof is provided with a stud or projection which is seated in the cam-groove or between working faces of a cam K, secured to the cam-shaft D, the construction of said cam and the timing in the movement thereof with relation to the movement of the turret being such as to impart the requisite advancing and retracting movement to the tool-carrying head $f$.

The stock or screw-rod to be operated upon is herein shown as revolubly-carried at one side of the tool-carrying head $f$ in axial alignment with the recess 33 and is adapted to be fed forward through said recess in position to be acted upon by the several tools by means and in a manner hereinafter described.

The tool-holders $g$, $g'$, $g^2$ and $g^3$, are provided with cutting-tools $h$, $h'$, $h^2$ and $h^3$, respectively, adapted for successively and separately operating upon the screw-rod (extended through the recess 33) in lines transversely thereto, each cutter having a separate and distinct function.

As a means for operating the cutter-holders to bring the tools $h$, $h'$, $h^2$ and $h^3$, successively into working position, a revoluble cam-wheel 38, is provided which cam-wheel is revolubly mounted concentric to the recess 33 of the tool-head $f$ upon a laterally projecting hub, or bearing 39, formed upon the upright 32 of said head, which cam-wheel has an orbital cam-face or cam-groove, 40, formed in the inner face thereof, in which are seated studs 41, extending through elongated radial slots 42, formed through said upright 32 and connected with the several tool-holders $g$, $g'$, $g^2$, and $g^3$ preferably in a manner shown in Figs. 1 to 10 inclusively. This cam-wheel, which is in the nature of a gear-wheel, and which will be hereinafter termed the "tool-traversing cam," is intermittently rotated by a pinion 43 splined to the intermittently rotating shaft C and which meshes with said cam-wheel, the hub of said pinion being flanged at one end and revolubly-supported in a journal-box, or bearing, at the lower end of the apron 31 of the tool-head, as clearly illustrated in Fig. 7 of the drawings.

In the drawings one form of chucking and wire-feeding mechanism is shown, but it is desired to state in this connection that any suitable form of mechanism for holding and feeding the screw-rod or wire in position to be operated upon by the several tools may be employed without departure from this invention. Briefly stated, this mechanism, in the form thereof herein shown, consists of a chuck-spindle 45, supported for longitudinal movement in a chuck-sleeve 46, supported for rotation in bearings formed in brackets 47, 47' secured in the bed of the machine, a supplemental chuck 48, supported for longitudinal movement in the chuck-spindle 45 and adapted for grasping the screw-forming rod with sufficient force to feed the same forward and backward upon the release of the jaws of the main chuck-spindle 45; means for rotating the chuck-sleeve in either direction; means for shifting the chuck-spindle longitudinally of said chuck-sleeve and means for shifting the supplemental chuck longitudinally of the main chuck, as will be hereinafter more fully described.

The chuck-spindle 45 has conically-flared work-grasping jaws 45′, at its forward end, and the chuck-spindle is conically bored at its forward end adjacent to said work-grasping jaws and is adapted to compress said jaws upon the work, or screw-rod upon the backward movement of the chuck-spindle 45 with relation to said chuck-sleeve.

Figures 13, 14, 15, 16, 17:
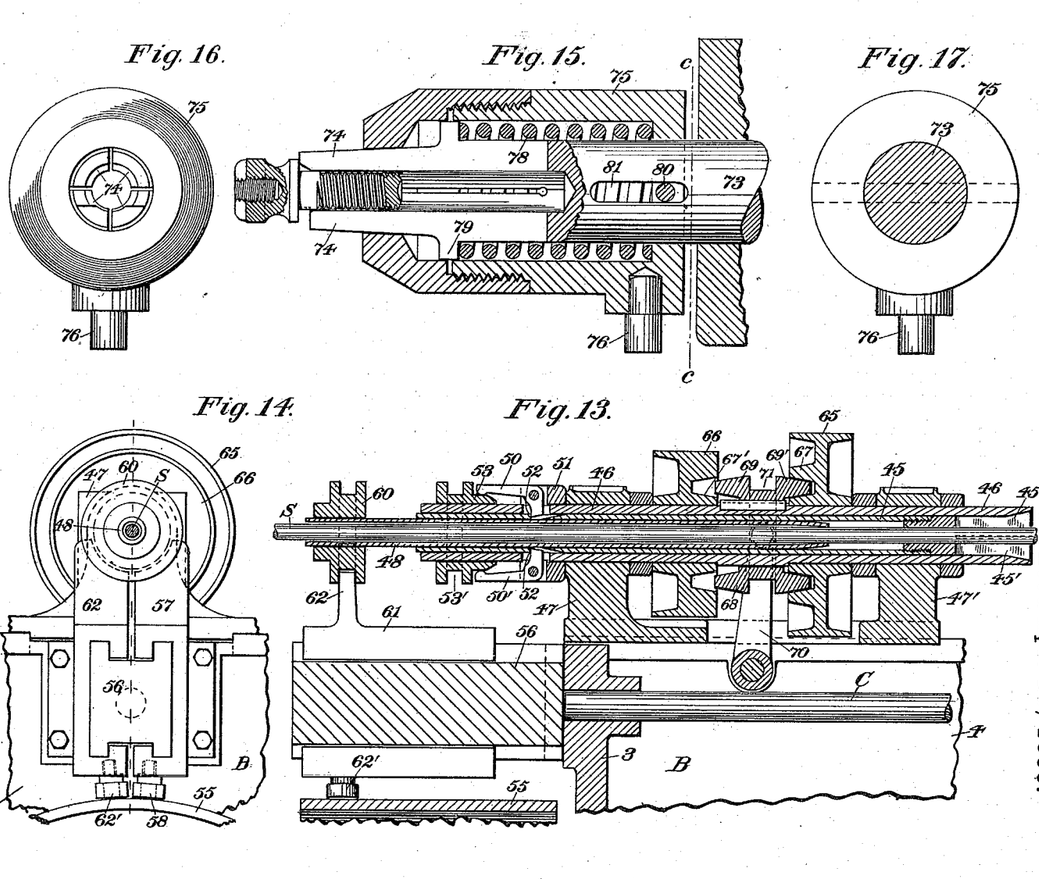
Fig. 13, Sheet 7, is a central longitudinal section of a portion of one end of the machine, showing the wire-chuck and feeding-mechanism.
Fig. 14, Sheet 7, is an end view of the same looking toward the right hand in Fig. 13.
Fig. 15, Sheet 7, is an enlarged longitudinal sectional view of the screw-blank grasping-chuck or carrier and means for operating the same, said figure showing a screw-blank as held in said chuck in position to be carried to the drilling-tool.
Fig. 16, Sheet 7, is an end view of the same, looking toward the right hand in Fig. 15, the screw-blank being removed.
Fig. 17, Sheet 7, is a cross-sectional view of the same taken on line $c$—$c$, Fig. 15.

As a means for shifting the chuck-spindle 45 longitudinally of the chuck-sleeve 46, a pair of elbow-levers 50 and 50′, are provided, said levers being oppositely disposed and pivotally-carried upon a collar, or hub 51, revolubly-supported upon the chuck-sleeve 46 at the rear end thereof as clearly illustrated in Fig. 13 and having a bearing against the rear side of the bracket 47. The inner ends of these levers extend through recesses formed in the chuck-sleeve and bear against abutments 52, upon the chuck-spindle 45, the forward ends of said levers being in position to be engaged and operated by the shiftable truncated or conical hub 53, supported for longitudinal movement upon the chuck-sleeve 46. This chuck-spindle-operating hub is peripherally-grooved, as shown at 53′, and is intermittently shifted through the medium of a shifter 54, connecting said hub with a cam 55, supported upon the cam shaft D. This shifter in the form thereof herein shown, is in the nature of a slide supported for movement longitudinally of the bed upon an outwardly-extending bracket 56, secured to the end of the bed B and having suitable slide-ways for said shifter, the shifter or slide having a vertically-extended arm 57, at its upper edge engaging in the groove of the chuck-spindle-operating hub 53 and having at its lower edge a stud 58, in position and adapted to be engaged by the working faces 59 of the said cam 55; and as a means for operating the supplemental chuck 48, said chuck is provided at its rear end with a peripherally-grooved hub 60, which is operated by a shifter 61, supported for sliding movement upon the bracket 56 at the side thereof opposite that upon which the shifter 54 is supported, said shifter 61 having two oppositely-disposed arms or studs, 62 and 62′, one of which engages in the groove of the hub 60, and the other of which is in position and adapted to be engaged by the working faces 63 of the cam 55, the working faces 59 and 63 of said cam 55 being so disposed with relation to each other and so timed in their movements as to alternately operate the two hubs 53 and 60 to impart the requisite shifting movement to the main and supplemental chucks to release and feed the rod forward or backward as required.

As a means for rotating the chuck-sleeve and its spindle in one or the other direction as required, a reversing mechanism is employed, which in the form thereof herein shown, consists of two pulleys 65 and 66, supported for rotation upon the chuck-sleeve 46 slightly remote from each other, as shown in Fig. 13, and having oppositely-disposed friction-rims 67 and 67′ on adjacent faces thereof; a clutch-wheel 68, splined for longitudinal movement upon the chuck-sleeve 46 between the pulleys 65 and 66 and having laterally-projecting flanges 69 and 69′, adapted for alternately engaging the friction-rims of the pulleys 65 and 66, and a shifter-lever 70, pivoted to the frame of the machine and carrying a stud at its upper end in engagement in a peripheral groove 71, in the clutch-wheel, the lower end of said shifter-lever carrying a stud in position and adapted to be engaged and operated by the working faces of a cam 72, secured to the cam-shaft D of the machine.

The pulleys 65 and 66, will be continuously driven in opposite directions by means of belts, (not shown,) extending over the same and leading to any suitable source of power.

Inasmuch as this mechanism for holding and feeding the screw-forming rod constitutes no part of this present invention, and is well known in the art to which this invention appertains, a verbose description thereof is deemed unnecessary to a clear understanding of the operation thereof.

The screw-making machine herein shown and described is especially intended for making special screws of high-grade, requiring a multiplicity of operations to complete the same, and for this purpose the machine is provided with a multiplicity of tools, each of which is constructed and adapted for performing one special operation or step of the series required for completing the screw; some of said tools operating upon the screw-rod transversely thereof for cutting down the stock, forming the head, and severing the blank so formed, while others of said tools operate successively to screw-thread the blank, ream or countersink the screw-threaded end thereof, axially-bore, screw-thread and slot the headed end, as will be hereinafter more fully described.

The turret G is herein shown as carrying four tools $e$, $e'$, $e^2$, and $e^3$, which are adapted to be successively brought into position in alignment with the screw-rod extending through the centrally-recessed tool-carrying head $f$; the tool $e$ being in the nature of a gage or stop for limiting the forward feed-movement of the screw-rod, herein designated by S. The next successive tool $e'$ is, or may be, in the nature of a box-tool adapted for conically grooving or countersinking the shank of the screw; the next succeeding tool $e^2$ is in the nature of a screw-threading tool, while the next or last succeeding tool $e^3$ of the series is in the nature of a screw-blank carrier or chuck adapted for engaging the screw-threaded end of the screw-blank, and, after said screw-blank has been severed from the screw-rod, carry the same away from said rod and into position to be operated upon by the successive tools carried by the tool-carrying heads $f'$, $f^2$ and $f^3$, respectively, as will be hereinafter more fully described.

Figure 22:
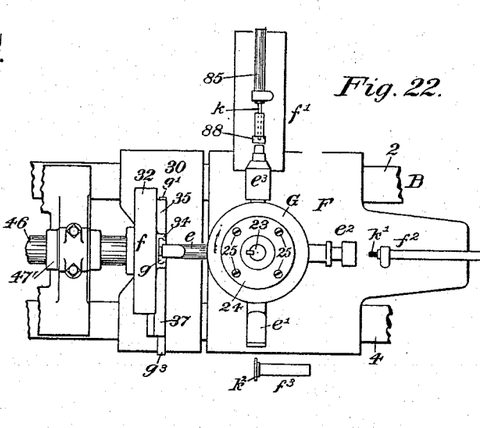
Figs. 22, 23 and 24, Sheet 8, are plan views of a portion of the screw-making machine, showing the three successive operations of completing the screw after the screw-blank has been cut off from the wire rod.
Figure 23:
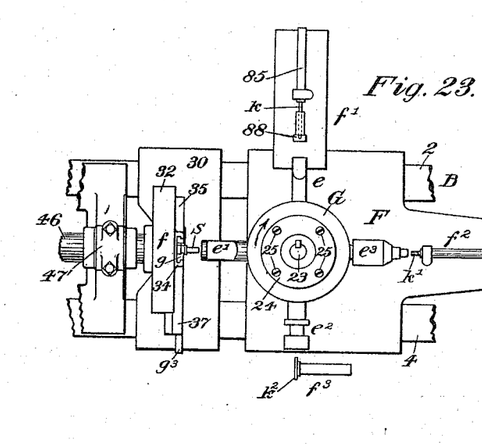

The operations requisite for forming a screw-blank upon the machine herein shown and described are as follows:—Assuming the tool-carrying head $f$ to be in its forward position, as illustrated in Figs. 7 and 22, and the turret to be in position illustrated in said figures, with the gage-tool, $e$, in alignment with the screw-rod S, which preparatory positioning of these parts takes place simultaneously with the forward feed movement of the screw-rod to be operated upon, the first operation performed upon the screw-rod is that of reducing or turning-down the forward end thereof to form a screw-shank of the requisite length and diameter. This is done by the tool $h$, of the head $f$, which is thrown into operative position by the tool-traversing cam 38, simultaneously with the forward movement of said head and screw-rod. As soon as the gage $e$, comes into the position shown in Figs. 7 and 22 and the screw-rod is in position to be operated upon, the tool $h$, begins its operation of turning down the end of the screw-rod, the tool-carrying head $f$, being moved slowly backward until it comes into the position shown in Fig. 23 which completes the operation of turning down the end of the screw-rod. The turret G is then rotated by means of the intermittently operated shaft C and its driving mechanism to bring the next succeeding tool $e'$, (which in this instance is a box-tool adapted for cup-shaping the end of the screw-shank,) into position to operate upon said shank. During this movement of the turret the tool-traversing cam 38 is partially rotated which throws the next succeeding tool $h'$, into engagement with and peripherally-grooves the screw-rod S in the rear of the reduced end thereof, which grooving, partially forms the head of the screw-blank, after which the box-tool, which is now in operative position, is carried against the end of the screw-rod by the advancing movement of the turret-carriage F and completes the operation of cup-shaping the end of said screw-rod. The carriage F is then returned to its former position and the turret G again rotated to bring the next succeeding tool $e^2$, (which in this instance is the screw-threading tool,) into position in alignment with the screw-rod S, and during this rotation of the turret G the tool-traversing cam 38 is again rotated which operates the next succeeding head-turning tool $h^2$ and completes the operation of forming the head of the screw-blank just before the screw-threading die or tool arrives at its operative position, after which the carriage F is advanced toward the tool-carrying head $f$, by means of its actuating-cam which causes the threading-die to cut the thread upon the reduced end of the screw-rod. When the screw-threading die has completed its operation of cutting the thread, the movement of the chuck-spindle is reversed and at the same time the carriage F is retracted to its original position, thereby screwing-off the threading-tool. After this operation has been completed, the carriage is again rotated to bring the next succeeding tool $e^3$, (which in this instance is a chucking-device,) into position to engage the end of the screw-rod. Then the carriage F is advanced by its operating cam toward the tool-carrying head $f$ which brings the chuck into engagement with the end of the screw-rod, and after the chuck has engaged the screw-rod, the cutting-off tool $h^3$ is immediately operated by a cam device hereinafter described and cuts off the completed screw-blank, leaving it in the chuck ready, upon the next rotation of the turret, to be carried forward by the chuck $e^3$ into position to be acted upon by the successive tools carried by the tool carrying heads $f'$, $f^2$ and $f^3$ which surround the turret, it being presented successively to said tools upon successive rotations of the turret, which, as hereinafter more fully described, bores, taps, and slots the headed end thereof.

From the foregoing description, it will be seen that, owing to the operative connection between the turret G and sliding head F, the movements of the several tools carried by the head $f$ are dependent upon and are governed by the rotary movement of the turret G, the successive tools of said head $f$ being successively positioned and operated simultaneously with the successive rotations of the turret G, the movements of all of said tools of said head $f$, with the exception of the cutting-off tool, taking place while the turret is rotating and during the interval of time elapsing between the shifting of one of the turret tools from its operative position in alignment with the screw-rod, and the operative positioning of the next adjacent tool, the tool-setting and traversing cam 38 and the turret-rotating mechanism being so connected and timed in their movements relative to each other as to accomplish this end.

The construction and operation of the tools carried by the tool heads $f'$, $f^2$ and $f^3$, and which act upon the headed end of the screw-blank, will be hereinafter fully described.

To facilitate the running-off of the screw-threading die from the screw-threaded end of the screw-rod after it has completed its cutting operation, and immediately upon the reversal of movement of the chuck-spindle and retractive movement of the carriage F, the spindle of said screw-threading die is supported for longitudinal and rotary movements in a sleeve fixed in the turret and is held against movement with relation thereto during the threading operation by a clutch-member upon the head of said spindle engaging a similar clutch-member upon the sleeve, the clutch-members being thrown out of engagement upon the retractive movement of the carriage F, as will be readily understood by reference to Fig. 6 of the drawings.

The screw-blank-engaging chuck, in the form thereof herein shown, consists of a chuck-spindle 73, which is fixed in the turret G and has resilient divided conical-faced screw-blank-grasping jaws 74, at the outer end thereof, and the shiftable jaw-compressing sleeve 75, supported at its inner end upon the spindle 73 and having a conical opening at its outer end, through which the grasping jaws are extended. As a means for actuating said sleeve to compress or release the jaws, said sleeve is provided with a stud 76, and the carriage F is provided with a cam-faced track 77, over which the stud 76 rides as the turret is rotated from the position shown in Fig. 24 to that shown in Fig. 22, which carries the sleeve 75 outward allowing the jaws 74 to spread sufficiently to engage the end of the screw-blank, said sleeve being retracted to impinge the blank between the jaws of the chuck-spindle by a spring 78, bearing at one end against the inner end of the sleeve, and at its opposite end against an annular flange 79, formed upon the chuck-spindle 73. To prevent accidental rotation of the sleeve 75 upon the spindle 73 said sleeve is provided with a pin 80, which extends through an elongated slot 81, formed through said spindle.

As a means for operating the cutting-off tool $h^3$ carried by the sliding head $f$ independent of the tool-traversing cam 38, an actuating lever 80, is provided, which actuating-lever is fulcrumed at 80', upon a bracket 81, secured to the side-rail of the bed of the machine, and has a bearing at its upper end against the outer end of the tool-holder or slide $g^3$, and has a bearing at its lower end against the cam face 82, of the cam-wheel K secured to the cam-shaft D, which cam-wheel reciprocates the sliding head $f$. The working face 82 of the cam-wheel for actuating the cutting-off tool will, in practice, be so constructed as to impart a relatively slow feed-movement to said tool, and will permit a relatively rapid retractive movement thereof, and the disposition of said working face and the timing in movement thereof with relation to the turret-actuating mechanism, will be such as to immediately operate the cutting-off tool after the screw-blank has been engaged by the chuck $e^3$. To impart a quick retractive movement to the tool-holder $g^3$ which carries the cutting-off tool $h^3$, a spring 84, is provided, which, in this instance, is shown seated in a groove formed in the front face of the tool-carrying head $f$ and bearing at its inner end against said head, and at its outer end upon an abutment secured to the tool-holder $g^3$.

In the drawings, the machine is shown as provided with three separate tools for successively operating upon the headed end of the screw blank after the same has been cut off from the screw-rod and carried to one side thereof. The first tool of this circuit of tools is in the nature of a drilling-tool $k$, in position and adapted for axially drilling the headed end of said screw-blank when the same has been shifted from the position shown in Fig. 2 to that shown in Fig. 22. This drilling-tool $k$ will be carried by a spindle 85, revolubly-supported in bearings 85', 85'', formed in brackets upon the tool-carrying head $f'$, which head is supported for sliding movement upon a bracket 86, formed upon the turret-carriage F at one side thereof in radial alignment with the axis of the turret G, said spindle being continuously rotated by means of a pulley 87, secured thereto, which pulley is driven by a belt (not shown) extending to any suitable source of power. Surrounding the drill or tool $k$ and supported for sliding movement, in a journal-bearing 85'' formed in the aforesaid bracket is a head-engaging or centering sleeve 88, which sleeve is adapted for engaging the head of the screw-blank and act as a support for the same during the operation of drilling. The head-receiving end of this sleeve 88 is retained normally in advance of the drill $k$ by means of a spiral spring 88', seated between the bracket, and the headed end of said sleeve.

As a means for operating the tool-carrying head $f'$ to bring the tool $k$ to its working position in engagement with the end of the screw-blank, and for retracting the same, a spring-advancing and cam-retracting mechanism is provided. In the form thereof herein shown, the head-advancing device consists of the spiral spring 90, seated in a groove formed in the bracket 86 of the carriage F and bearing at its outer end against said bracket, and at its inner end against a stud secured to the sliding head $f'$, said spring normally acting to slide the head $f'$ toward the turret G, as will be fully understood by reference to Fig. 6 of the drawings; and the retracting device consists of a retracting-lever 91, fulcrumed upon a bracket 91', secured to the frame of the machine and bearing at its upper end against a stud 92, secured to the sliding head $f'$, and at its lower end upon the working face of a cam-wheel O, secured to the cam-shaft D. This retracting-lever has two functions. It not only acts to impart a retractive movement to the sliding head $f'$, but also acts to impart an unlocking movement to the turret-locking device, as will be hereinafter more fully described.

The turret-locking device in the form thereof herein shown comprises two sliding members 93 and 93', in interlocking engagement one with the other, the member 93 constituting the locking-bolt, and the member 93', constituting the actuator for said locking-bolt. The bolt 93 is seated for sliding movement in a vertical recess formed through the carriage F and is adapted for successively entering the lock-notches formed in the under face of the turret G in position to register with the recess in which the bolt is seated. This bolt is preferably cut away at one side thereof and has formed in its face an inclined groove 94, in which is seated an inclined projection 94', formed upon the adjacent face of the bolt-actuator 93', which bolt-actuator is seated in a recess 95, formed in the carriage F at right angles to the recess in which the lock-bolt 93 is seated.

As a means for normally retaining the bolt 93 in locked engagement with the turret G, a spring 96, is provided which is seated in the recess 95 and bears at one end against the head of the bolt-actuator 93', and at its opposite end against a collar 96', secured in said recess, and as a means for imparting an unlocking, or retracting movement to the bolt-actuator, said actuator is provided with a stud at the outer end thereof which extends into the path of movement of a strap or projection 97, upon the inner end of the sliding head $f'$, so that as the sliding head is retracted by means of the retracting-lever 91 operated by the cam O, the bolt-actuator 93' will be retracted and will shift the bolt 93 out of engagement with the turret, leaving said turret free to be rotated. This retraction of the sliding head $f'$ and the unlocking of the turret G takes place immediately upon the completion of the operation of drilling the head of the screw-blank by the tool $k$. The second tool $k'$ of this circuit or series of tools for operating upon the head of the screw-blank is herein shown in the nature of a tap adapted for tapping the bore formed in said head by the preceding tool $k$. This tap which will be carried in a chuck-spindle or holder in any usual manner is shown located in alignment with the screw-rod but at the opposite side of the turret G, said spindle being revolubly-supported in bearings formed in brackets 100, secured to or formed integral with the tool-carrying head $f^2$ which is supported for sliding movement upon the reciprocating carriage F, as clearly illustrated in Figs. 1 and 2 of the drawings.

Figure 1:
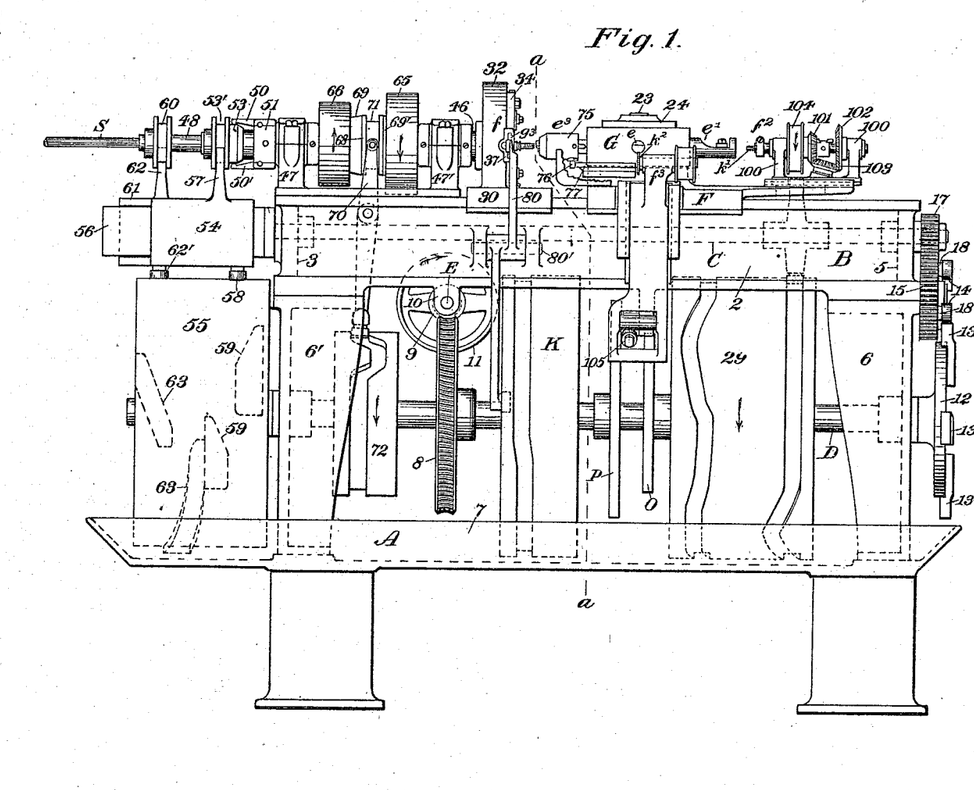
Figure 2:
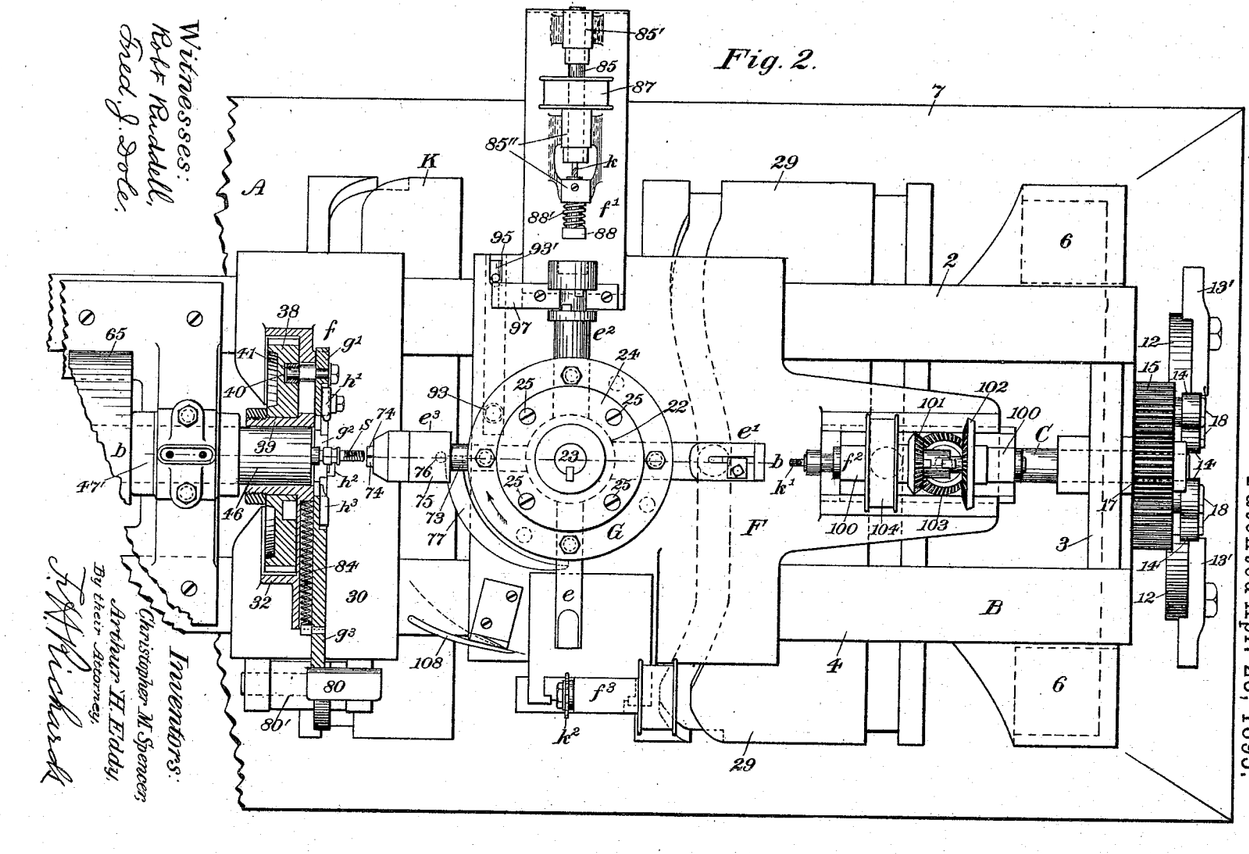
Fig. 2, Sheet 2, is a plan view of a portion of the same, on an enlarged scale, portions thereof being shown in section.
Figures 3, 4:
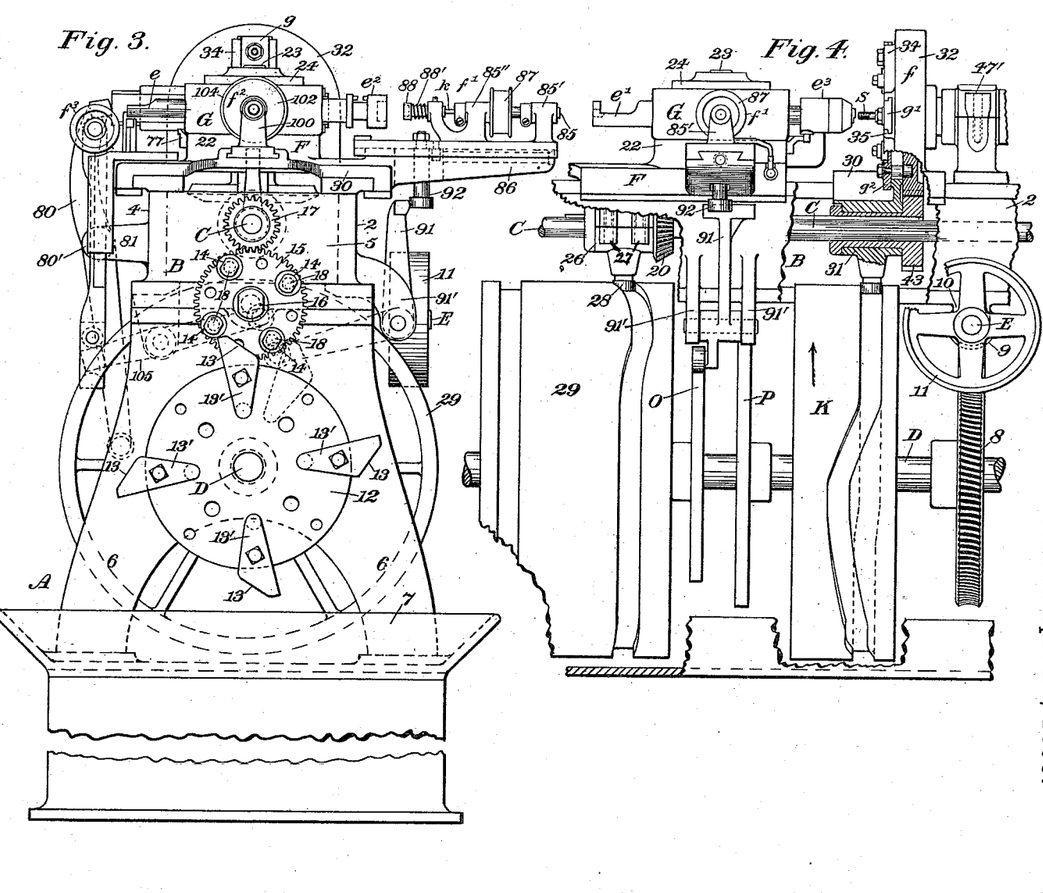
Fig. 3, Sheet 3, is an end view of the screw-making machine looking toward the left hand in Fig. 1, said figure being drawn on a scale slightly larger than that of Fig. 1.
Fig. 4, Sheet 3, is a sectional side elevation of a portion of the machine looking toward the left hand in Fig. 3.

As a means for moving the tool-carrying head $f^2$ together with the tool $k'$ toward and from the turret G, a shifter is provided, which for convenience, is shown in dotted lines in Fig. 1 supported for sliding movement upon the intermittently rotating shaft C and has an upwardly extending arm in engagement with the tool-carrying head $f^2$ and has a downwardly extending arm whose extreme end has a bearing between the working faces of the turret-carriage-reciprocating cam 29 secured to the cam-shaft D, and as a means for rotating the tool $k'$ alternately in opposite directions, a system of reversing-gears is employed, which, in the form thereof herein shown, consists of two oppositely and remotely-disposed bevel-gears 101 and 102, loosely mounted for rotation upon the chuck-spindle of the tap $k'$, an intermediate bevel-gear 103, in mesh with the aforesaid bevel gears, and a clutch-member carried by the chuck-spindle and adapted for alternately engaging the gear-wheels 101 and 102, one of which gear-wheels carries a pulley, 104, adapted to be driven by a belt (not shown) from any suitable source of power. This reversing mechanism is so constructed and organized that immediately upon the retractive movement of the tool-carrying head $f^2$ the clutch will be shifted out of engagement with one, and into engagement with the opposite gear-wheel and reverse the movement of the tap which will cause the same to be screwed out of the threaded hole in the end of the screw-blank, which construction and organization will be fully understood by reference to Figs. 1 and 2 of the drawings.

The third tool $k^2$ of the circuit or series of tools for operating upon the headed end of the screw-blank, is in the nature of a slotting saw revolubly-supported upon a horizontal shaft, journaled in bearings in the vertically reciprocating tool-carrying head $f^3$ located preferably in opposition to the tool-carrying head $f'$ at the opposite side of the turret G. This slotting saw $k^3$ which if desired, might be a grooving tool, is normally located below the plane of movement of the tools carried by the turret G.

As a means for imparting an advancing and retracting movement to the slotting saw, an actuating-lever 105, is provided, which actuating-lever is fulcrumed upon a bracket 106, secured upon the frame of the machine and is operatively connected at one end with the vertically reciprocating head $f^3$, and has a bearing at its opposite end upon the cam face of a let-off cam P, a spring 107, being provided to retract the actuator 105 when the working-end thereof has passed the let-off portion of the cam P which throws the slotting saw into engagement with the head of the screw-blank with a yielding force and completes the operation of slotting the head.

Figure 24:
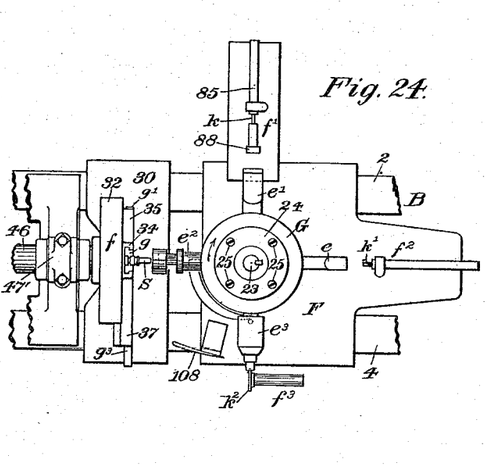

As a means for extracting the completed screw from the chuck $e^3$, an extractor 108, is provided which in the form thereof herein shown, consists of a flanged plate secured to the turret-carriage with its screw-engaging end located in the path of travel of said screw and in position to engage said screw in the rear of the head thereof as the turret is shifted from the position shown in Fig. 24 to that shown in Fig. 22. After the screw-head has been slotted, the parts being in the position illustrated in Fig. 24, the turret is revolved which brings the screw formed in contact with the advanced end of the extractor, which extractor will, as the turret continues its movement, force the screw out of its holding-chuck $e^3$.

It will be noticed by reference to the drawings that while the screw-rod is being operated upon to form a screw-blank by the tools of the tool-carrying head $f$, the tools $k$, $k'$ and $k^2$ are each simultaneously operating upon the headed end of the screw-blank already formed, the successive operations of the tools $k$, $k'$ and $k^2$ being coincident with the successive positioning of the successive tools of the turret G.

Having thus described our invention, we claim—

1. In a screw-making machine, the combination with the rod-carrying spindle, of a turret supported for revolution in a horizontal plane and having a turret-slide and adapted for movement toward and from said spindle and adapted also for receiving and carrying the screw-blank, a plurality of tool-carrying heads disposed circumferentially around said turret and supported upon the turret-slide for sliding movement toward and from said turret, means in connection with and adapted for imparting an automatic intermittent rotary movement to said turret and thereby presenting the blank to the successive tools of said heads, means for automatically actuating said turret toward and from the rod-carrying spindle, and means for automatically and successively actuating the tool-carrying heads toward and from said turret and operating the tools, substantially as described and for the purpose set forth.

2. In a screw-making machine, the combination with the rod-carrying spindle, of a tool-carrying head supported for movement longitudinally of the rod-carrying spindle, a plurality of tools carried by said head in radial disposition with relation to the axis of said spindle and adapted to have each a sliding movement toward and from said axis, a revoluble turret, supported for reciprocation toward and from said tool-carrying head, means for operating said tools intermittently and successively, and means for intermittently rotating and reciprocating the turret, substantially as described and for the purpose set forth.

3. In a screw-making machine, the combination with the intermittently-revoluble turret and the rod-carrying spindle and with means for intermittently rotating the turret and for rotating said spindle, of a tool-carrying head supported for sliding movement toward and from the turret, a plurality of radially-disposed tool-holders carried in said head and adapted for reciprocation toward and from a common center, means for intermittently and successively imparting a radial movement to said tool-holders, and means for intermittently reciprocating said head, substantially as described and for the purpose set forth.

4. In a screw-making machine, the combination with the rod-carrying spindle, of a sliding tool-head, carrying a plurality of sliding tool-holders, adapted for carrying tools for operating upon a rod carried by said spindle, a revoluble turret carrying a plurality of tools, and means in connection with said tool carrying head and turret for intermittently rotating said turret and simultaneously imparting an advancing movement to the tools of said head, substantially as described and for the purpose set forth.

5. In a screw-making machine, the combination with the rod-carrying spindle, of a tool-carrying head supported for sliding movement adjacent to said spindle, a plurality of radially-disposed tools carried in said head an intermittently revoluble turret adapted for sliding movement toward and from said work-carrying head, means in connection with said tool-head and turret for intermittently rotating said turret and for simultaneously imparting a radial movement to the tools of said head, and means for moving the turret and head toward and from each other independently, substantially as described and for the purpose set forth.

6. In a screw-making machine, the combination with the bed of the machine, of a transversely-recessed tool-carrying head supported for sliding movement upon said bed, a plurality of radially-disposed tools carried in said head and adapted to have a sliding movement toward and from a common center, a rod-carrying spindle supported in alignment with the recess of said head and adapted for projecting a rod into position to be operated upon by the tools carried in said head, a tool-setting and traversing cam revolubly-supported adjacent to and operatively connected with said tools, an intermittently-revoluble turret, and means for simultaneously imparting an intermittent rotation to the turret and tool-traversing cam, substantially as described and for the purpose set forth.

7. In a screw-making machine, the combination with the revoluble rod-carrying spindle, of a sliding tool-head carrying a plurality of radially-disposed sliding tool-holders, a revoluble tool-traversing cam in connection with said tool-holders, a revoluble turret supported for sliding movement toward and from the tool-carrying head, and means in connection with and adapted for intermittently rotating the turret and tool-traversing cam, substantially as described and for the purpose set forth.

8. In a screw-making machine, the combination with the rod-carrying spindle, of a tool-carrying head supported for sliding movement and carrying a plurality of radially-disposed tool-holders, a tool-setting and traversing cam in operative connection with said tool-holders and adapted for imparting a radial movement to said tool-holders, a revoluble turret supported for sliding movement toward and from said tool-carrying head and carrying a plurality of radially-disposed tools, means in connection with, and adapted for, simultaneously and intermittently rotating the tool-traversing cam and turret to bring successive tools of the turret and tool-carrying head into working position, and means for imparting a sliding movement to the tool-carrying head and turret, substantially as described and for the purpose set forth.

9. In a screw-making machine, the combination of a transversely-recessed tool-carrying head supported for sliding movement and carrying a plurality of radially-disposed sliding tool-holders surrounding the rod-carrying spindle, a rod-carrying spindle revolubly supported with its axis coinciding with the common center of said tools, a tool-traversing cam revolubly supported adjacent to and in operative connection with the tool-holder and having an orbital cam-face adapted for successively carrying successive tool-holders into and out of operative relation with the screw-forming rod, means for imparting an intermittent rotary movement to said cam to successively operate the tool-holders, and means for moving the tool-carrying head longitudinally of the rod-carrying spindle, substantially as described and for the purpose set forth.

10. In a screw-making machine, in combination, a transversely-recessed tool-carrying head supported for sliding movement and carrying a plurality of radially-disposed sliding tool-holders, a rod-carrying spindle revolubly supported with its axis coinciding with the common center of said tools, a tool-traversing cam revolubly-supported adjacent to, and in operative connection with, the tool-holder, means for imparting an intermittent rotary movement to said cam to successively operate the tool-holders, a tool-carrying turret supported for sliding movement toward and from said head, and means for moving the tool-carrying head and turret toward and from each other, substantially as described and for the purpose set forth.

11. In a screw-making machine, the combination with the rod-carrying spindle and with a plurality of screw-forming tools surrounding the turret in circumferential direction and supported upon the turret-slide, of a revoluble turret having a turret-slide and disposed centrally of said tools and supported for revolution and reciprocation in a horizontal plane and carrying a screw-blank carrier adapted for receiving a screw-blank and for subsequently presenting the blank to the action of the successive tools, means for imparting an automatic intermittent rotary movement to said turret, and means for automatically and intermittently presenting said screw-blank carrier in operative relation to said successive tools, substantially as described.

12. In a screw-making machine, the combination with the revoluble rod-carrying spindle, of a non-rotative tool-carrying head, supported for sliding movement longitudinally of said spindle, and carrying a plurality of radially-disposed sliding tool-holders; a tool-traversing cam, revolubly-supported adjacent to, and in operative connection with, said tool-holders, and having an orbital cam-face, adapted to successively and intermittently carry the tool-holders into, and out of, working position, and also having peripheral-teeth, an intermittently-revoluble shaft carrying a gear-wheel, in mesh with the teeth of said cam; and means for intermittently-rotating said shaft, substantially as described.

13. In a screw-making machine, the combination with the rod-carrying spindle, of a tool-carrying head adjacent thereto; a plurality of tool-holders, supported for sliding movement in said head; a peripherally-toothed revolubly-supported tool-traversing cam, in operative connection with said tool-holders, and having an orbital cam-face, adapted to successively and intermittently carry the tool-holders into, and out of, operative position; an intermittently-revoluble shaft, carrying a gear-wheel in mesh with said cam; and means for intermittently-rotating said shaft, to rotate the cam, and impart an intermittent sliding movement to the tool-holders, successively, substantially as described.

14. In a screw-making machine, the combination with the rod-carrying spindle, of a carriage supported for sliding movement toward and from said spindle, a turret revolubly-mounted upon said carriage and adapted for carrying a plurality of tools, means for intermittently rotating said turret to bring successive tools into working position, a plurality of tool-carrying heads surrounding said turret, and supported for sliding movement upon the carriage in alignment with the working positions of the successive tools of the turret, means for moving the carriage together with its tool-carrying heads toward and from the spindle, and means in connection with and adapted for independently moving the tool-carrying head toward and from the turret, substantially as described and for the purpose set forth.

15. In a screw-making machine, the combination with the rod-carrying spindle, a turret supported for intermittent rotary movement upon a sliding carriage and carrying a plurality of radially-disposed tools, means for intermittently rotating said turret and for moving the carriage toward and from the rod-carrying spindle, a plurality of circumferentially and remotely-disposed tool-carrying heads one of which heads is supported for sliding movement toward and from the carriage, and others of which are supported upon said carriage and are adapted to have a movement toward and from the turret, means for intermittently rotating the turret, and independent tool-head-operating mechanism in connection with and adapted for moving said tool-carrying head toward and from the turret, substantially as described and for the purpose set forth.

16. In a screw making machine, the combination with the revoluble turret, of mechanism for intermittently rotating said turret consisting of two parallel shafts, one of which is continuously rotated through the medium of a worm wheel in connection with a worm upon a driving shaft, a cam-wheel carried by one of said shafts and having a plurality of peripheral projections, or working faces, a gear-wheel adjacent to said cam-wheel and having a plurality of laterally-projecting working faces adapted to be engaged by the working faces of the cam-wheel, a gear-wheel carried by the turret-rotating shaft in engagement with the aforesaid gear-wheel, and gearing revolubly-connecting said shaft with the turret, substantially as described.

17. In a screw-making machine, the combination with the turret and with the intermittently rotating shaft in operative connection therewith, of driving mechanism therefor consisting of a driving wheel having a plurality of regularly spaced radial cams thereon, an intermediate cam-wheel having cams cooperating with the cams of the driving-wheel, a gear wheel connecting said intermediate cam-wheel with the turret-actuating shaft, a shaft for actuating the driving cam-wheel, and means for continuously rotating said last-mentioned shaft substantially as described.

18. In a screw-making machine, the combination with the rod-carrying spindle, of a sliding tool-carrying head adjacent thereto, a tool-holder supported for sliding movement in a slide-way formed in said head and carrying a tool, an actuator for said tool-holder consisting of a lever fulcrumed upon the frame of the machine and in operative connection at one end with said tool-holder, a cam for operating said actuator, a spring in connection with the tool-holder and its carrying head in position and adapted for imparting a retractive movement to said tool-holder, substantially as described and for the purpose set forth.

19. In a screw-making machine, the combination with the sliding tool-carrying head *f*, substantially as described, of a cutting-off tool supported in a sliding holder connected with said head, a spring in connection with said holder and adapted for retracting the same, and a cam and lever for imparting an advancing movement to said tool-holder, substantially as described and for the purpose set forth.

20. In a screw-making machine, the combination with the rod-carrying spindle, of a transversely-recessed non-rotating head supported for reciprocation longitudinally of said spindle, a plurality of tool-holders radially-supported for reciprocation in slide-ways in said head, a peripherally-toothed cam-wheel having an orbital cam-groove in the face thereof adjacent to the tool-holders, studs connected with said tool-holders and in engagement with said cam-groove, and an intermittently revoluble shaft having a pinion in mesh with the teeth of the cam-wheel and adapted for rotating said cam-wheel to intermittently and successively reciprocate said tool-holders to carry the tools thereof into and out of working engagement with the rod carried by said spindle, substantially as described.

21. In a screw-making machine, the combination with the revoluble turret supported upon a sliding carriage, of a series of tool-carrying heads circumferentially-disposed with relation to said turret and supported for sliding movement upon said carriage, and a cam and lever in operative connection with each sliding head for imparting an advancing and retracting movement thereto, and means for rotating said cam, substantially as described and for the purpose set forth.

22. In a screw-making machine, the combination with the rod-carrying spindle; of a turret supported for revolution in a horizontal plane and having a turret-slide, and having also a screw-blank-grasping chuck or carrier; a plurality of tool-carrying heads disposed circumferentially around said turret and supported for reciprocation upon the turret-slide toward and from the same; means for intermittently rotating said turret to bring the chuck into position to engage the screw-blank; and means for automatically opening the chuck-jaws, moving the turret forward to engage the chuck-jaws with the screw-blank, closing said chuck-jaws upon the screw-blank, and subsequently retracting and rotating said turret in a horizontal plane to intermittently bring said chuck into working position relatively to the successive tool-carrying heads, substantially as described and for the purpose set forth.

23. In a screw-making machine, the combination with the turret revolubly supported upon a sliding carriage and having a series of lock-notches, of a locking-device for said turret consisting of a bolt supported for vertical movement in a bearing formed in the carriage said bolt being adapted to enter said successive notches to lock the turret in its several positions and having an inclined groove formed in one face thereof, an actuator supported for horizontal movement in a recess formed in said carriage and having an inclined projection in engagement with the inclined groove of the bolt, a spring in engagement with and adapted for normally retaining the actuator and the bolt in their locking position, and a cam-and-lever mechanism for automatically and intermittently retracting said actuator to unlock the turret, substantially as described.

24. In a screw-making machine, the combination with the intermittently-revoluble turret and a sliding tool-head carried at one side thereof, of a locking-device for said turret consisting of a sliding bolt, an actuator therefor in operative connection with the sliding tool-head, and a retracting-device for said tool-head and bolt-actuator consisting of a lever in operative connection at one end with said head, and a revoluble cam for operating said lever, substantially as described.

25. In a screw-making machine, the combination with the rod-carrying spindle, of a sliding head carrying a plurality of tools in position and adapted for reducing the end of a rod to form a screw-blank, means for successively operating said tools, a turret carrying a threading-tool adapted for threading the end of said rod, and a screw-blank-engaging chuck, a cutting-tool carried by the sliding head in position to sever the screw-blank, a drilling-tool carried by a head supported for sliding movement at one side of the turret in position to operate upon the head of the screw-blank as the same is brought into alignment with the screw-blank carrier, a tapping-tool revolubly-carried in a head supported for sliding movement at one side of said turret in position to operate upon the head of the screw-blank, and a slotting or milling-tool supported at one side of said turret in position to operate upon the head of the screw-blank; means for intermittently rotating the turret to bring the successive tools thereof contiguous to the screw-rod and to bring the screw-blank-carrier with the screw-blank therein into position to be successively operated upon by the successive tools, and means for imparting a sliding movement to the tool-carrying head, substantially as described and for the purpose set forth.

CHRISTOPHER M. SPENCER.
        ARTHUR H. EDDY.

Witnesses:
    FRED. J. DOLE,
    ROBT. H. RUDDELL.